US012679711B2

(12) United States Patent
Mallory

(10) Patent No.: US 12,679,711 B2
(45) Date of Patent: Jul. 14, 2026

(54) WRENCH APPARATUS

(71) Applicant: Mallory Designs LLC, Pittsburgh, PA (US)

(72) Inventor: Timothy Mallory, Pittsburgh, PA (US)

(73) Assignee: Mallory Designs LLC, Pittsburgh, PA (US)

( * ) Notice: Subject to any disclaimer, the term of this patent is extended or adjusted under 35 U.S.C. 154(b) by 339 days.

(21) Appl. No.: 18/142,330

(22) Filed: May 2, 2023

(65) Prior Publication Data

US 2023/0365389 A1 Nov. 16, 2023

Related U.S. Application Data

(60) Provisional application No. 63/341,481, filed on May 13, 2022.

(51) Int. Cl.
*B67B 7/18* (2006.01)
*B67B 7/44* (2006.01)

(52) U.S. Cl.
CPC . *B67B 7/18* (2013.01); *B67B 7/44* (2013.01)

(58) Field of Classification Search
CPC .... B67B 7/00; B67B 7/12; B67B 7/14; B67B 7/16; B67B 7/18; B67B 7/44; B25B 13/04; B25B 13/06; B25B 13/065; B25B 13/46; B25B 13/461; B25B 13/48; B25B 13/481; B25B 13/56; B25B 23/007; B25B 23/0035; B25B 23/02; B25B 23/142
See application file for complete search history.

(56) References Cited

U.S. PATENT DOCUMENTS 3,812,741 A * 5/1974 Heine ........................ B67B 7/18 81/3.4
4,004,049 A * 1/1977 Horwat ...................... B32B 7/12 427/256
4,723,465 A * 2/1988 Hughes ...................... B67B 7/44 81/3.4
4,760,763 A * 8/1988 Trick ........................ B67B 7/18 81/3.4
5,388,297 A * 2/1995 Ross ......................... B67B 7/44 81/3.09
6,105,468 A * 8/2000 Fohrman ................... B67B 7/44 81/3.4
6,179,138 B1 * 1/2001 Puleston ................... B67B 7/16 81/3.15

(Continued)

*Primary Examiner* — Robert J Scruggs
(74) *Attorney, Agent, or Firm* — The Powers IP Law Firm

(57) ABSTRACT

A wrench apparatus is provided. The wrench apparatus includes a handle portion having a first end and a second end located opposite the first end, and a body portion extending from the first end. The body portion has a first gripping portion and a second gripping portion located concentric with respect to the first gripping portion. The first and second gripping portions are each configured to engage a first closure and a second closure, respectively, of a first container and a second container, respectively, in a press fit manner and remove the first and second closures, respectively, therefrom responsive to the handle portion being rotated with respect to the first and second containers, respectively. The first and second gripping portions are each annular-shaped and have an inner diameter. The inner diameter of the second gripping portion is greater than the inner diameter of the first gripping portion.

14 Claims, 8 Drawing Sheets

(56) References Cited

U.S. PATENT DOCUMENTS 6,666,110 B1 * 12/2003 Buettner ................... B67B 7/18
81/3.43
7,004,049 B2 * 2/2006 So ............................. B67B 7/44
7/152
7,267,031 B1 * 9/2007 Burton ...................... B67B 7/18
81/3.4
8,844,405 B2 * 9/2014 Colgan ..................... B67B 7/44
81/3.4

* cited by examiner

WRENCH APPARATUS

CROSS-REFERENCE TO RELATED APPLICATION

This application claims priority to and claims the benefit of U.S. Provisional Patent Application Ser. No. 63/341,481, filed May 13, 2022, and entitled "WRENCH APPARATUS".

BACKGROUND

Opening containers is often rather difficult for users. For example, roll on pilfer proof ("ROPP") and injection mold manufactured ("IMM") closures often require significant torque in order to be twisted off by a user. This presents challenges to users who lack the necessary wrist strength and/or dexterity to remove these closures. For example, users desiring to remove ROPP and IMM closures from relatively small liquor bottles may not possess the necessary strength to remove these closures or may injure their hands in the process. Accordingly, there is room for improvement in this regard.

SUMMARY

In one example, a wrench apparatus is provided. The wrench apparatus includes a handle portion having a first end and a second end located opposite the first end, and a body portion extending from the first end. The body portion has a first gripping portion and a second gripping portion located concentric with respect to the first gripping portion. The first and second gripping portions are each configured to engage a first closure and a second closure, respectively, of a first container and a second container, respectively, in a press fit manner and remove the first and second closures, respectively, therefrom responsive to the handle portion being rotated with respect to the first and second containers, respectively. The first and second gripping portions are each annular-shaped and have an inner diameter. The inner diameter of the second gripping portion is greater than the inner diameter of the first gripping portion.

In another example, a wrench apparatus includes a handle portion having a first end and a second end located opposite the first end, and a body portion extending outwardly from the first end, the body portion including a receiving portion and a gripping portion located concentric with respect to the receiving portion. The gripping portion is configured to engage a closure of a container in a press fit manner and remove the closure therefrom responsive to the handle portion being rotated with respect to the container. The gripping portion and the receiving portion are each annular-shaped and have an inner diameter, the inner diameter of the gripping portion being greater than the inner diameter of the receiving portion.

BRIEF DESCRIPTION OF DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

As employed herein, the term "coupled" shall mean connected together either directly or via one or more intermediate parts or components.

As employed herein, the term "mesh" shall mean interface with in an interlocking manner via a one to one ratio of components. For example, a component with 5 ribs meshes with another component having 5 ribs wherein each of the 5 ribs of the two components interface with each other in a one to one relationship.

Figure 1:
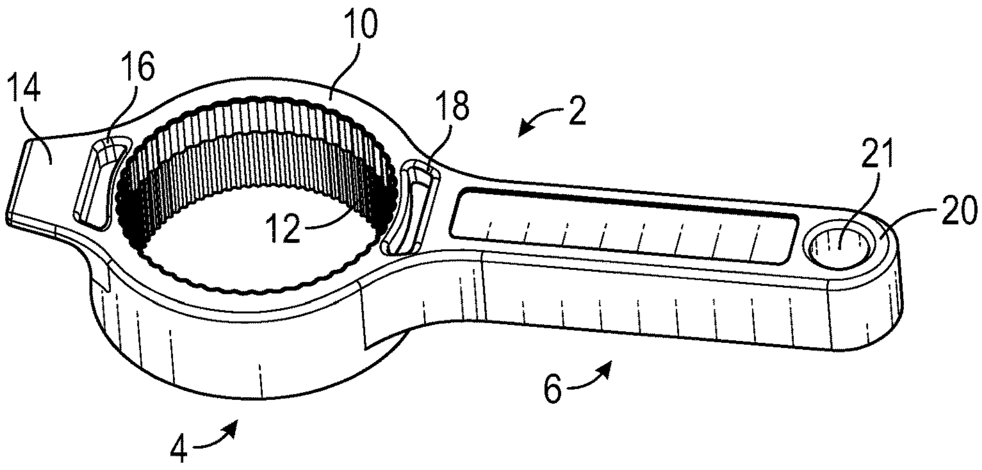
FIGS. 1 and 2 are top and bottom isometric views, respectively, of a wrench apparatus, according to one non-limiting embodiment of the disclosed concept.

FIG. 1 is an isometric view of a wrench apparatus 2, in accordance with one non-limiting embodiment of the disclosed concept. As will be discussed in greater detail below, apparatus 2 is configured to assist a user in removing a closure from a container, and is beneficial as compared to typical apparatuses at least in that it is configured to open predetermined closures and, in some embodiments, open different closures with different aspects of the same apparatus 2. Continuing to refer to FIG. 1, features of apparatus 2 will now be discussed. Apparatus 2 has a body portion 4 and a handle portion 6. Handle portion 6 extends outwardly from body portion 4 at a first end and extends to another end 20. Body portion 4 has a first gripping portion 10 and a second gripping portion 12 extending from first gripping portion 10. Although wrench apparatus 2 is discussed in association with two gripping portions 10, 12, suitable alternative wrench apparatus may have any number (e.g., 1, 2, 3, etc.) of gripping portions, without departing from the scope of the disclosed concept. Each gripping portion 10, 12 has a central thru hole with a common central axis. In other words, first and second gripping portions 10, 12 can be understood to both be concentric, e.g., annular-shaped about the same axis. The purposes of gripping portions 10, 12 will be described below when wrench apparatus 2 is shown employed with various containers.

Figure 14:
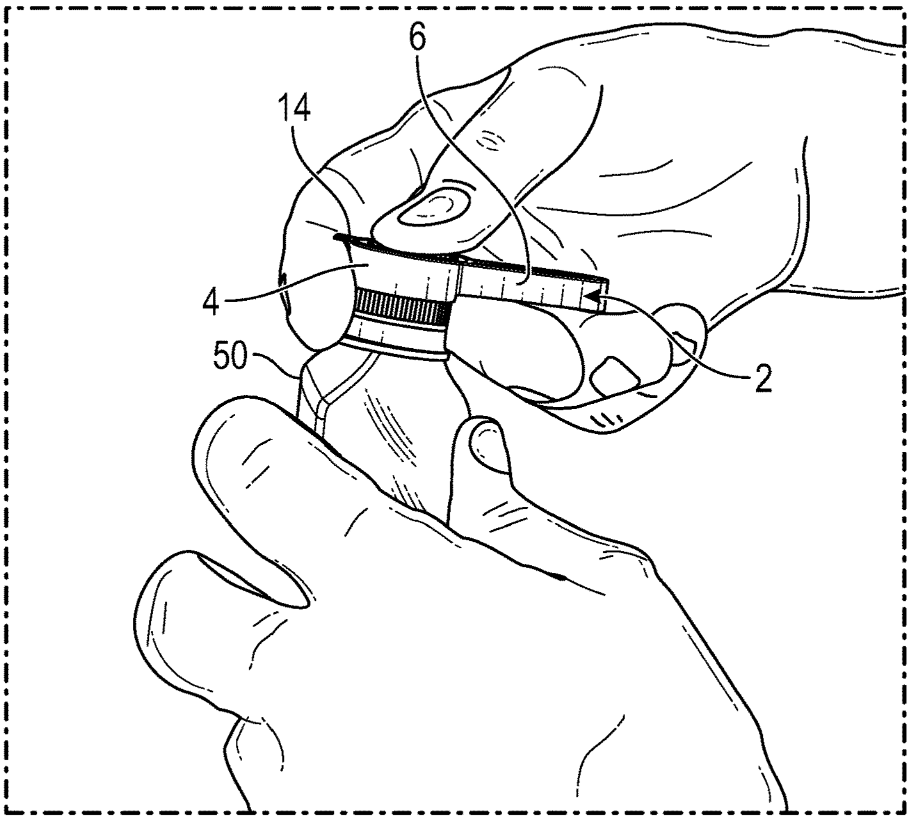
FIG. 14 shows the wrench apparatus of FIG. 1 engaged with a single serve liquor container.

Body portion 4 also has a tab member 14 extending outwardly from first gripping portion 10 away from handle portion 6. Tab member 14 is advantageously configured to assist a user in removing a pop top can. In one example, the tab member 14 has a top surface and the handle portion 6 has a top surface located coplanar with the top surface of the tab member 14. Moreover, as shown in FIG. 14, with the apparatus 2 secured to the closure of a single serve bottle 50, typical removal of the closure may include placing an index finger under tab member 14 with other fingers under handle portion 6, and a thumb being used to "pop" out the closure.

Figure 7:
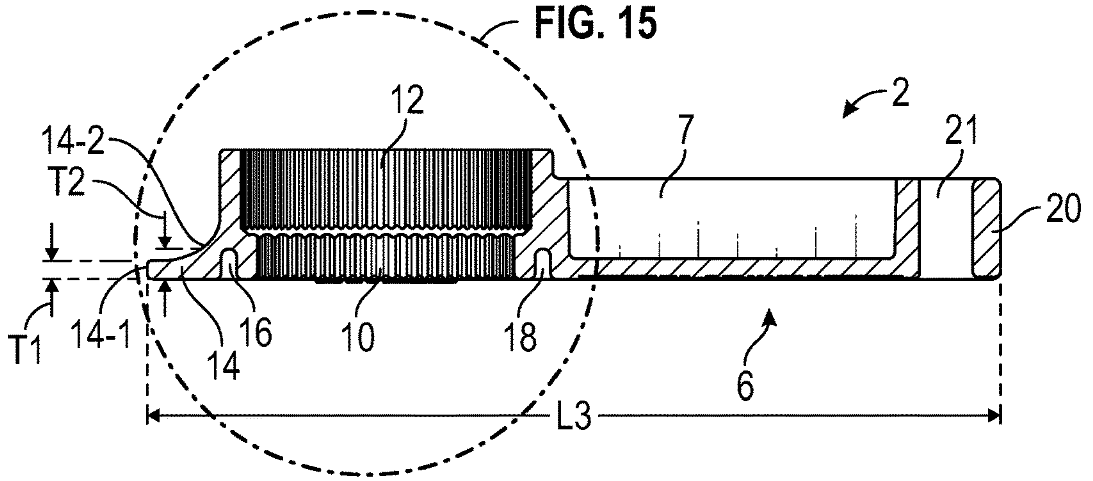
FIGS. 7, 8, and 9 are section, top, and left side views, respectively, of the wrench apparatus of FIG. 1.
Figure 8:
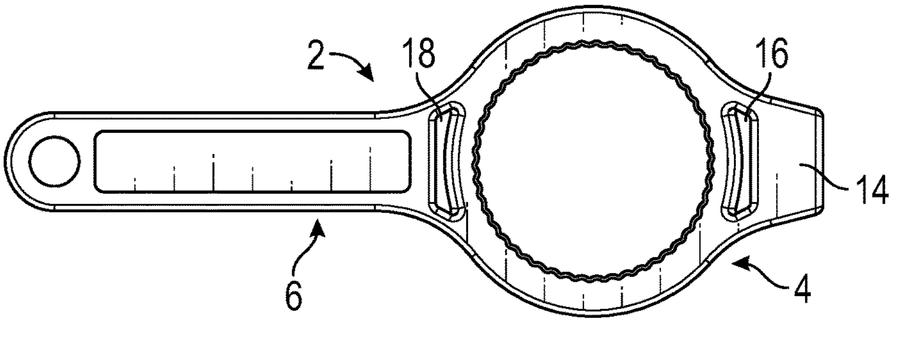
Figure 9:
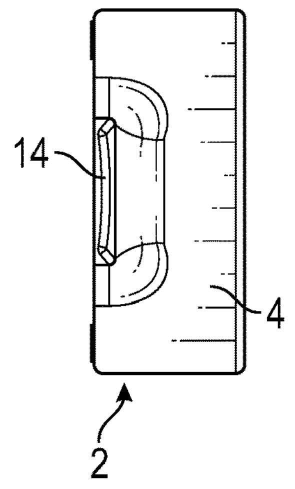

Additionally, as shown in FIG. 7, the tab member 14 preferably has a distal end 14-1 and an extension portion 14-2. The extension portion 14-2 extends from the first gripping portion 10 and is located between the distal end 14-1 and the first gripping portion 10. Each of the distal end 14-1 and the extension portion 14-2 have a corresponding thickness T1, T2, and the thickness T2 of the extension portion 14-2 is greater than the thickness T1 of the distal end 14-1 in order to provide strength to the tab member 14 while allowing the tab member 14 to open a pop top can.

Continuing to refer to FIG. 1, body portion 4 also has a pair of grooved regions 16, 18, each located on an opposing side of first gripping portion 10. Grooved regions 16, 18 advantageously assist in minimizing the amount of material used to manufacture wrench apparatus 2. In other words, grooved regions 16, 18 are material savers that minimize the thickness of the wall of body portion 4.

Figure 2:
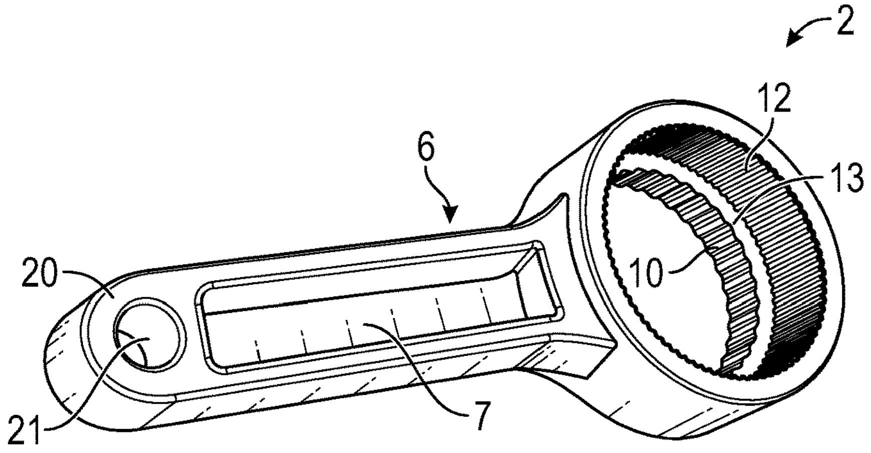
Figure 13:
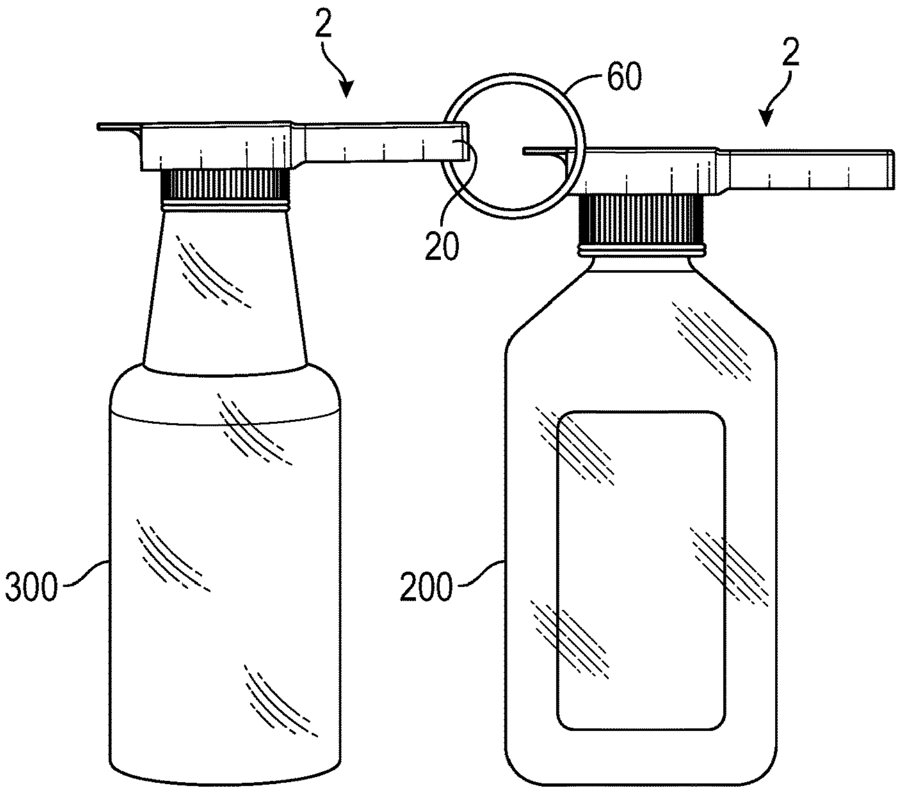
FIG. 13 shows a front view of two wrench apparatuses, each the same as the wrench apparatus of FIG. 1, and each engaged with a different liquor container.

FIG. 2 shows a rear isometric view of wrench apparatus 2. As shown, handle portion 6 has an elongated cavity 7 on a bottom side thereof which extends from at or about body portion 4 to proximate the end 20 of handle portion 6. Handle portion 6 has the relatively large cavity 7 in order to save material during manufacturing of apparatus 2. In this manner, significantly large numbers of identical apparatus can be manufactured in a relatively efficient manner. Furthermore, it will be appreciated that apparatus 2 may be an injection molded piece made from a single piece of material, such as a monomer, polymer, or a mixture thereof. Continuing to refer to FIG. 2, end 20 may have a thru hole 21 in order to allow a keyring (e.g., keyring 60 shown in FIG. 13) to extend through and couple apparatus 2 to a keychain. In this manner, wrench apparatus 2 is configured to have a length L3 (see FIG. 7) from end 20 to a distal portion of tab member 14 that is preferably less than two inches long, which corresponds to the length of a standard door key.

Figure 3:
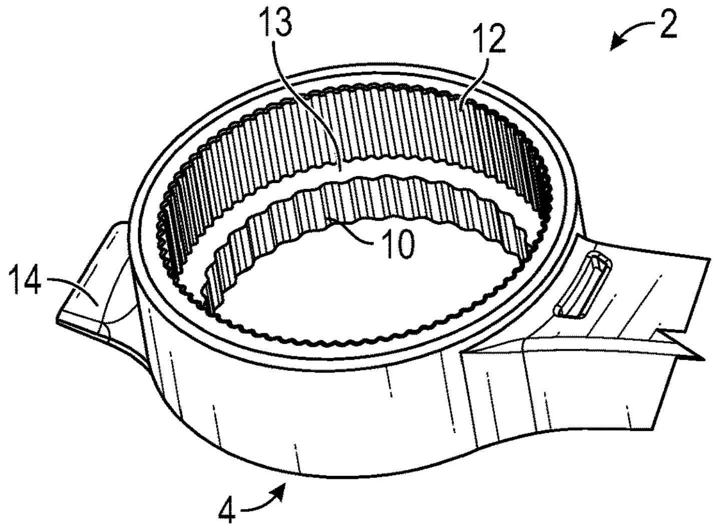
FIG. 3 is another bottom isometric view of the wrench apparatus of FIGS. 1 and 2, shown with a portion of the handle portion removed.
Figure 4:
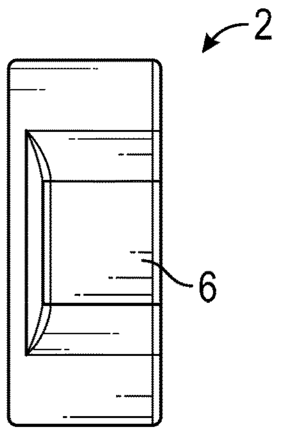
FIGS. 4, 5, and 6A are right side, front, and bottom views, respectively, of the wrench apparatus of FIG. 1.
Figure 5:
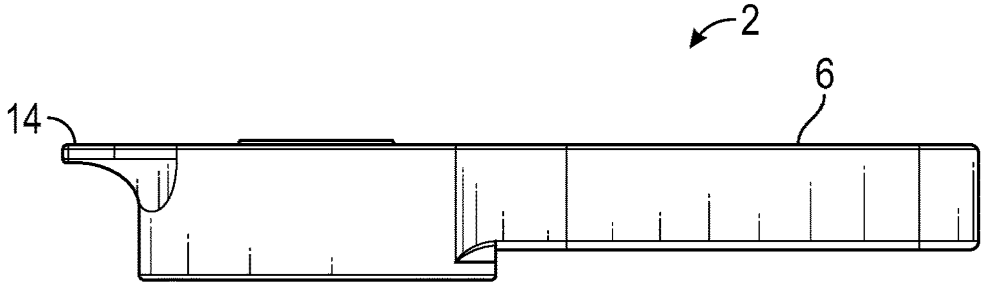

FIGS. 3-9 show additional views of apparatus 2. As shown in FIG. 3, which shows an enlarged view of a portion of apparatus 2 (e.g., body portion 4), first and second gripping portions 10, 12 can be understood as each having a plurality of ribs on an inside diameter. As depicted more clearly in the bottom view of FIG. 6A, first gripping portion 10 has a first inner diameter D1 (e.g., a diameter extending through a center of each of the ribs) and second gripping portion 12 has a second inner diameter D2 (e.g., a diameter extending through a center of each of the ribs), wherein D2 is greater than D1. In this manner, it will be appreciated that apparatus 2 is configured to remove two different types of closures, each having a different diameter and a different number of ribs.

Figure 6A:
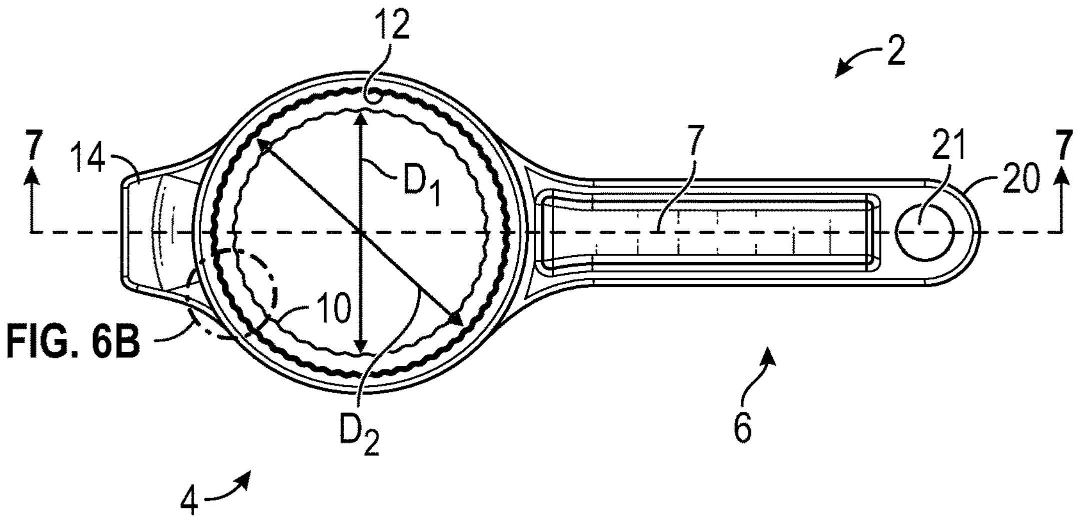
Figure 6B:
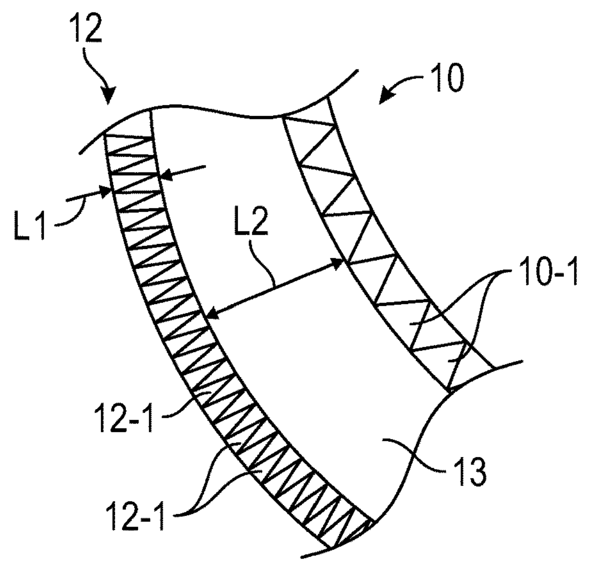
FIG. 6B is a simplified enlarged view of a portion of the bottom view of the wrench apparatus of FIG. 6A.

Furthermore, FIG. 6B shows a simplified enlarged view of a portion of the apparatus of FIG. 6A. As shown, each of the ribs 12-1 of the second gripping portion 12 has a first length L1 from a base to a peak thereof, and the body portion 4 further includes a surface 13 extending from the second gripping portion 12 radially inwardly to the first gripping portion 10. Furthermore, the surface 13, which may be frustoconical-shaped, extends radially inwardly a second length L2 greater than the first length L1. In this manner, the wrench apparatus 2 is advantageously configured to open two different types of closures, e.g., closures 210, 310, as will be discussed below.

Continuing to refer to FIG. 6B, the first and second gripping portions 10, 12 have corresponding ribs 10-1, 12-1, and the ribs 12-1 of the second gripping portion 12 are more numerous than the ribs 10-1 of the first gripping portion 10. In one example, the first gripping portion 10 has between 20 and 25 ribs 10-1, and the second gripping portion 12 has between 80 and 85 ribs 12-1. In yet a more specific embodiment, the first gripping portion 10 has 23 ribs 10-1, and the second gripping portion 12 has 82 ribs 12-1. As will be discussed below, the 23 ribs 10-1 of the first gripping portion 10 advantageously allow the first gripping portion 10 to be employed to open containers having a plurality of different ribs (e.g., without limitation, between 27 and 50 ribs) via an interference fit, whereas the 82 ribs 12-1 of the second gripping portion 12 advantageously allow the second gripping portion 12 to open certain closures that also have 82 ribs (e.g., and have a relatively large amount of friction doing so). Certain closures (e.g., IMM closure 210, discussed below) are mass produced to have exactly 82 ribs. Accordingly, the wrench apparatus 2 is constructed in an improved manner that allows it to open IMM closures (e.g., closure 210) via a meshed interlocking of the ribs 12-1 in a one to one ration to provide for increased friction and thus torque, and also open large numbers of other closures (e.g., ROPP closure 310) that have may have varying numbers of ribs (e.g., between 27 and 50 ribs). The disclosed wrench apparatus 2 thus allows these closures to be opened in an improved and simplified manner (e.g., one single tool).

Figure 10:
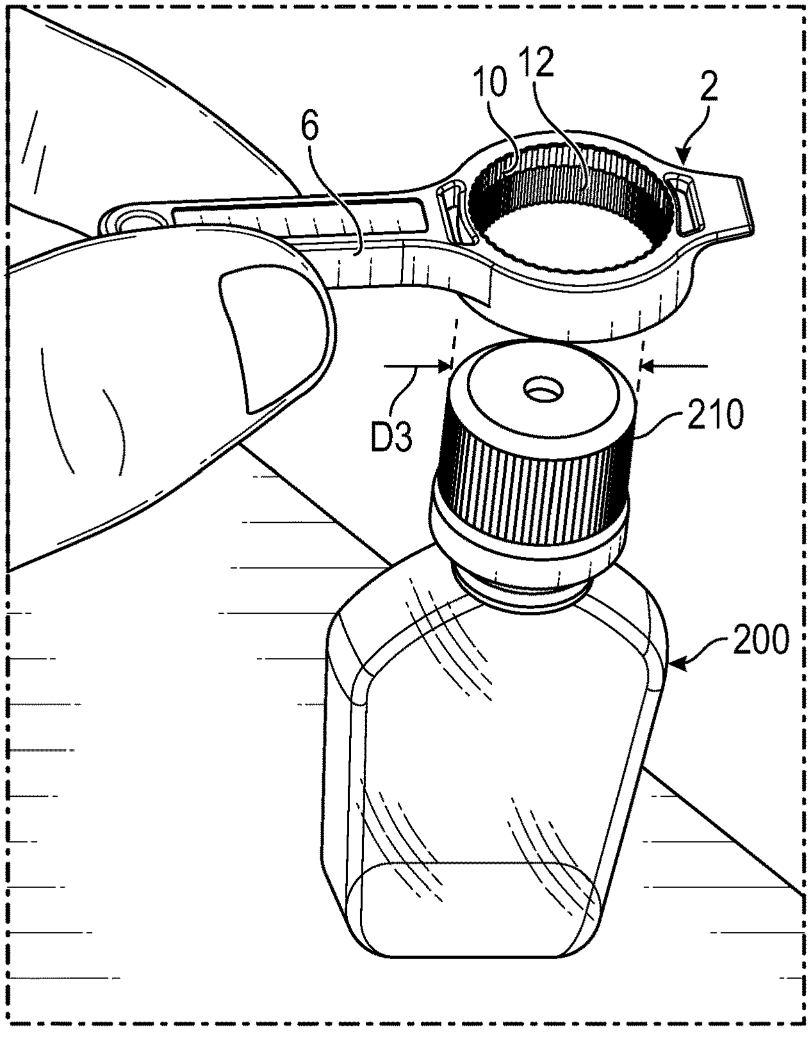
FIG. 10 shows an individual holding the wrench apparatus of FIG. 1, and preparing to dispose the wrench apparatus on a liquor container.
Figure 11:
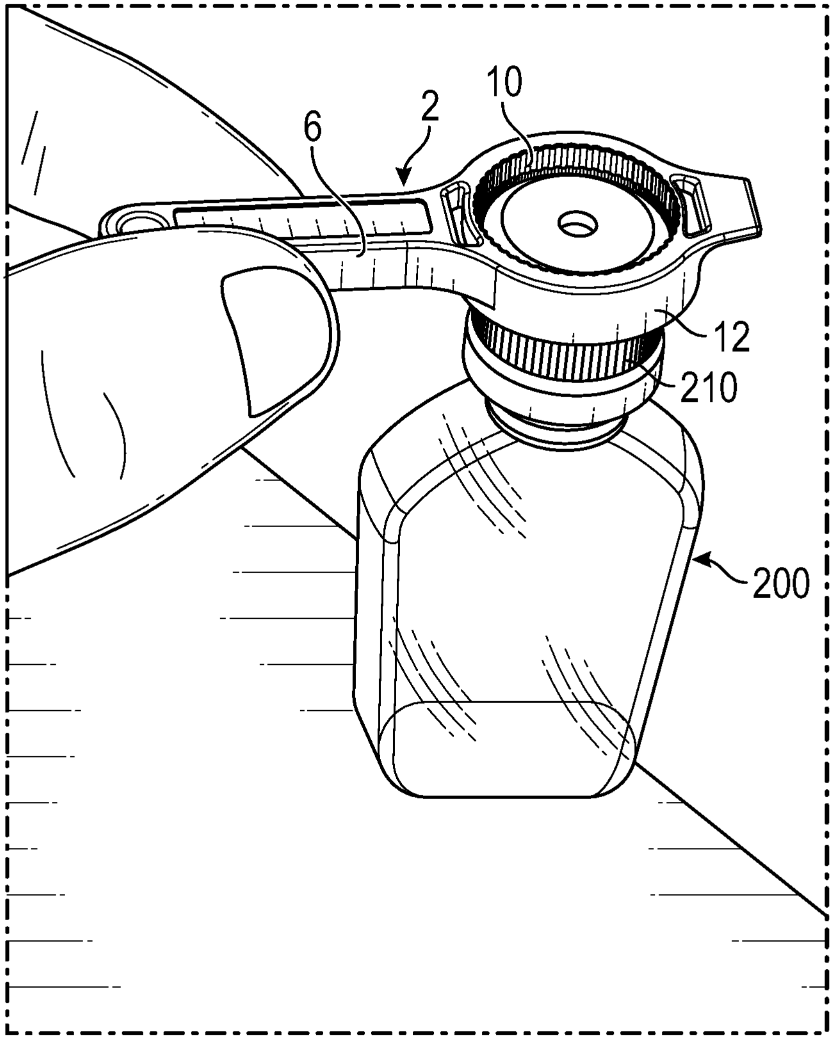
FIG. 11 shows the wrench apparatus of FIG. 1 engaged with the liquor container of FIG. 10, and an individual preparing to turn the wrench apparatus.
Figure 12:
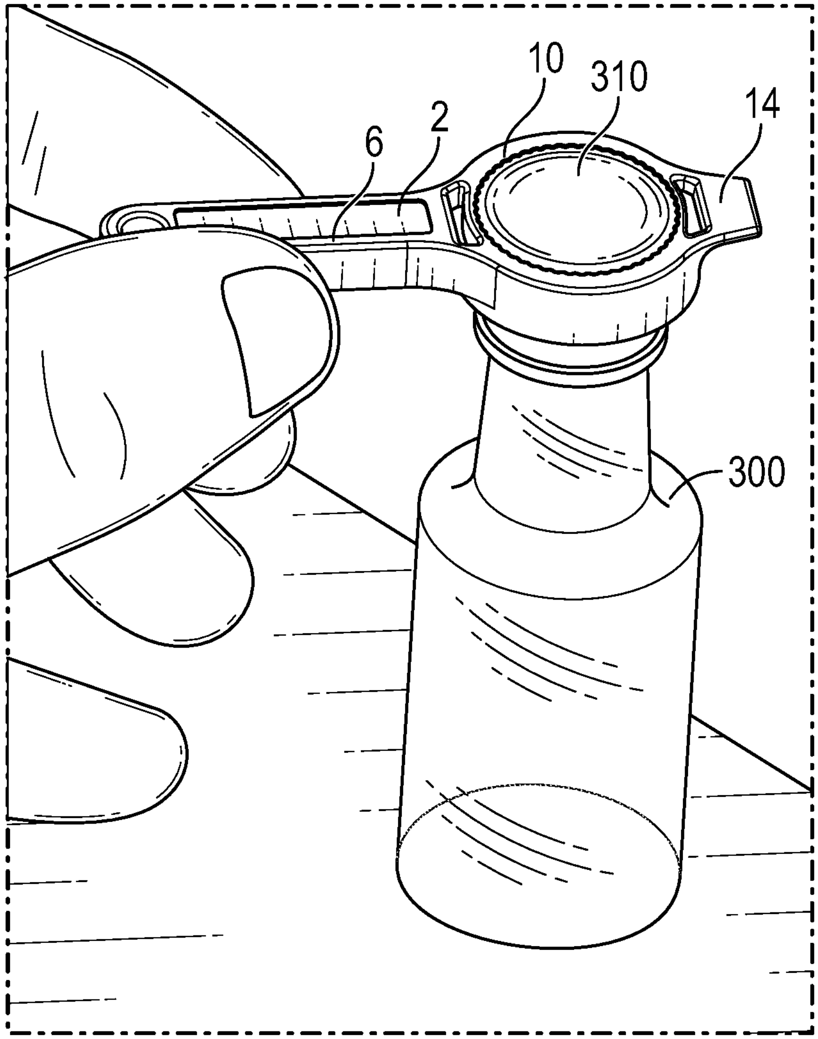
FIG. 12 shows the wrench apparatus of FIG. 1 engaged with another liquor container.

For example, FIGS. 10-12 illustrate different examples of apparatus 2 being employed to remove closures from different containers. FIGS. 10 and 11 illustrate apparatus 2 as employed with a first container (e.g., without limitation, whiskey liquor container 200). As shown in FIG. 10, which shows wrench apparatus 2 being lowered onto liquor container 200, liquor container 200 has a closure (e.g., IMM closure 210) having a plurality of ribs (e.g., 82 ribs) and a diameter D3. It will be appreciated that the number of ribs of IMM closure 210 corresponds to, or is the same as, the number of ribs of second gripping portion 12 of wrench apparatus 2, thereby allowing second gripping portion 12 to properly engage and mesh with IMM closure 210. The meshing between these ribs advantageously results in a large amount of friction being created, thus allowing the apparatus 2 to impart large amounts of torque to the liquor container 200).

Figure 15:
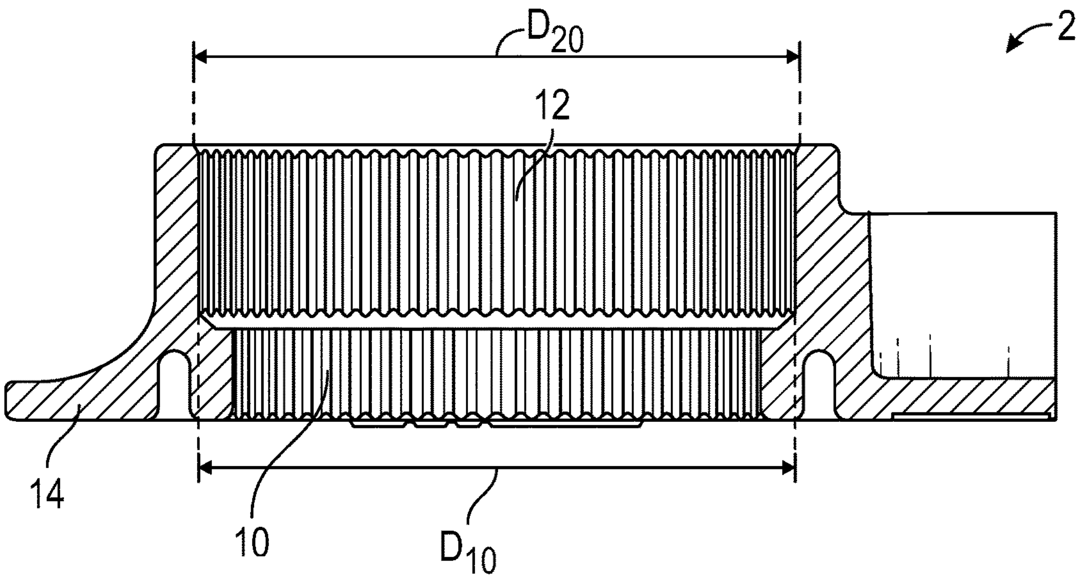
FIG. 15 shows an enlarged view of a portion of the section view of the wrench apparatus of FIG. 7.

The number of ribs of each of the first and second gripping portions 10, 12 may also each be evenly spaced around the respective diameter, in order accommodate the respective closures. Additionally, it will be appreciated that the ribs of second gripping portion 12 are tapered in order to accommodate manufacturing variations in package closures. More specifically, it will be understood that the ribs of gripping portions 10, 12 are at an angle with respect to a horizontal plane of body portion 4 that is less than 90 degrees in order to assist with installation of the apparatus 2 onto the closures 210, 310. That is, the ribs of gripping portions 10, 12 are together partially conical-shaped. See, for example, FIG. 15, which shows different diameters D10, D20 at ends of second gripping portion, with D20 being greater than D10. This conical effect, or slight taper, functions to create a locking effect with closures (e.g., closures 210, 310). For example, if the gripping portions 10, 12 were not angled (not the case with wrench apparatus 2), alignment between the wrench apparatus 2 and a closure would have to be nearly perfect for proper functionality to occur. Moreover, the taper is also desired for manufacturing via injection molding. Accordingly, it will be appreciated that the tapered ribs also allow for relatively easy installation and engagement over the closures and subsequent removal of the closures.

Furthermore, diameter D3 may correspond to, or be the same as, diameter D2 of second gripping portion 12 such that when wrench apparatus 2 is lowered onto IMM closure 210, the ribs of second gripping portion 12 engage and mesh with, or interlock with, the ribs of IMM closure 210 in a press fit manner. Additionally, as stated above, the number of ribs 12-1 of second gripping portion 12 may be greater than the number of ribs 10-1 of first gripping portion 10. Accordingly, because in the example embodiment second gripping portion 12 has more ribs than, and a greater diameter than, first gripping portion 10, when wrench apparatus 2 is lowered onto IMM closure 210, IMM closure 210 will generally be prevented from extending past second gripping portion 12. See, for example, FIG. 11, which shows IMM closure 210 being disposed in the central thru hole of second gripping portion 12, and extending from an end portion of first gripping portion 10 away therefrom. That is, a large portion of wrench apparatus (e.g., first gripping portion 10) is disposed above IMM closure 210 when wrench apparatus is fully engaged with IMM closure 210.

Continuing to refer to FIG. 11, when wrench apparatus 2 is engaged with IMM closure 210 (e.g., has been lowered onto IMM closure 210 such that the ribs of second gripping portion 12 are meshed/engaged with the ribs of IMM closure 210), IMM closure 210 can be removed from container 200 with a relatively simple twist motion of apparatus 2. That is, a user can grasp handle portion 6 and, with container 200 held securely, rotate handle portion 6 in a counterclockwise manner, with respect to container 200, thereby allowing IMM closure 210 to be twisted off of container 200. Stated differently, the torque imparted onto IMM closure 210 by the relatively long lever arm of handle portion 6 allows IMM closure 210 to be removed with significantly less force than would be required if a user were to directly engage IMM closure 210 with their hand. As a result, users who have dexterity issues are advantageously provided with a relatively simple and easy mechanism to open containers.

FIG. 12 shows a view of wrench apparatus 12 lowered onto a rum container 300. In the example embodiment, container 300 has a ROPP closure 310. As illustrated, the first gripping portion is engaging the ribs of ROPP closure 310 in a press fit manner such that all a user needs to do is grasp and rotate handle portion 6 in a counterclockwise manner with respect to container 300 in order to twist off and remove ROPP closure 310 from container 300. In one example, the ROPP 310 closure has between 27 and 50 ribs, and the first gripping portion is configured to engage those ribs via an interference fit. Furthermore, diameter D1 of first gripping portion 10 is preferably the same as the diameter of ROPP closure 310. In this manner, apparatus 2 is uniquely tailored to open closures of two different specific containers 200, 300 based on unique rib characteristics of each of those containers 200, 300. Notice how, in the example of FIG. 12, a top surface of first gripping portion 10 is generally coplanar with a top surface of closure 310.

As stated above, first and second gripping portions 10, 12 have different diameters and different numbers of ribs. As such, it will be appreciated that wrench apparatus 2 is therefore configured to be employed with two types of containers 200, 300, each having a corresponding different closure 210, 310. If a user desires to remove IMM closure 210 from container 200, the user can simply and easily lower wrench apparatus 2 onto container 200 until the ribs of closure 210 mesh/interlock with the ribs of second gripping portion 12, and twist handle portion 6, as discussed above. Correspondingly, if a user desires to remove ROPP closure 310 from container 300, the user can simply and easily lower the same wrench apparatus 2 onto container 300 until the ribs of first gripping portion 10 engage with the ROPP closure 310 via an interference fit, and twist handle portion 6 in a counterclockwise motion with respect to container 300.

Although the disclosure has been presented with wrench apparatus 2 having first and second gripping portions 10, 12, it will be appreciated that a suitable alternative wrench apparatus could only have one gripping portion, without departing from the scope of the disclosed concept. See, for example, FIG. 17, which shows a wrench apparatus 702 having only one single gripping portion 712. That is, a body portion of an alternative wrench could have a single gripping portion. Additionally, although the disclosure has been presented with gripping portions 10, 12 having ribs to assist with removing closures 210, 310, suitable alternative wrench apparatus are contemplated herein which are devoid of ribs. In these wrench apparatus, gripping portions may have a smooth inner wall which utilizes a locking taper conical diameter.

Figure 16:
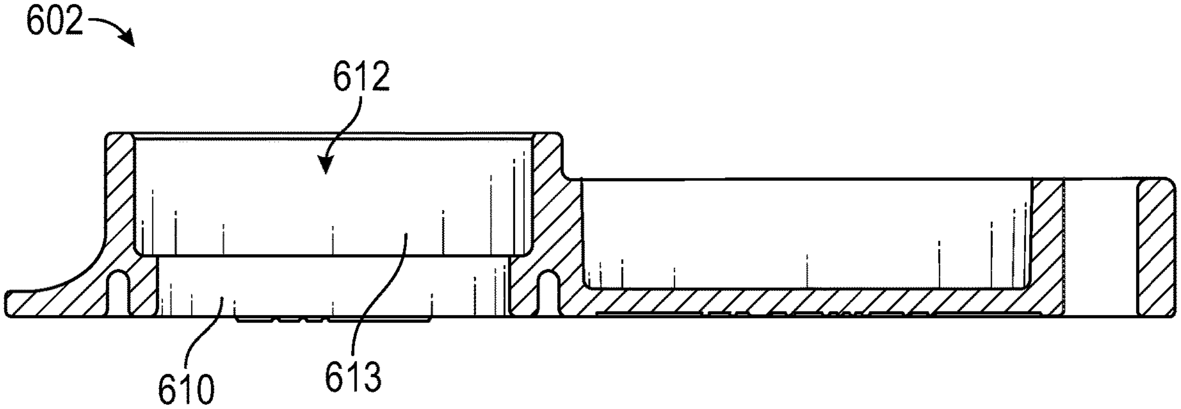
FIG. 16 shows a section view of another wrench apparatus, in accordance with another non-limiting embodiment of the disclosed concept.
Figure 17:
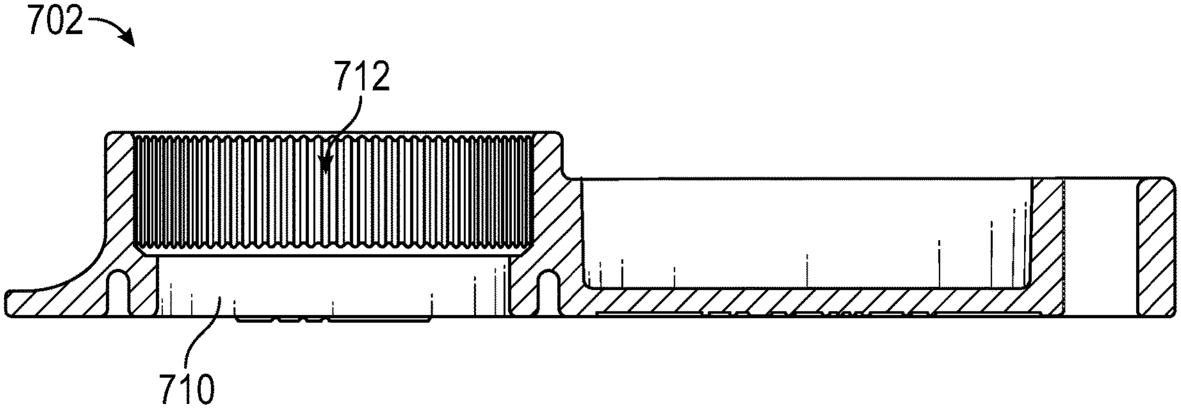
FIG. 17 shows a section view of another wrench apparatus, in accordance with another non-limiting embodiment of the disclosed concept.

For example, FIGS. 16 and 17 show wrench apparatuses similar to the apparatus 2, and like numbers represent like features. As shown in FIGS. 16 and 17, the body portions have the gripping portion 612, 712 and receiving portions 610, 710 extending from and located concentric with respect to the gripping portions 612, 712. The gripping portions 612, 712 are each configured to engage a closure of a container in a press fit manner and remove the closure therefrom responsive to the handle portion being rotated with respect to the container. Additionally, the gripping portions 612, 712 and the receiving portions 610, 710 are each annular-shaped and have an inner diameter, the inner diameter of the gripping portions 612, 712 being greater than the inner diameter of the receiving portion 610, 710. It will be appreciated that the apparatuses 602, 702 are each similar (e.g., made of similar materials, have tab members, have similar length, etc.) to the apparatus 2, and so only differences will be discussed herein.

As shown in FIG. 16, the gripping portion 612 is in the form of a first gripping portion having a smooth inner wall, and the receiving portion 610 is a second gripping portion 610 having a smooth inner wall. In one example, the body portion further comprises a frustoconical-shaped surface 612 extending from the inner wall of the first gripping portion 612 to the inner wall of the second gripping portion 610.

Referring to FIG. 17, the gripping portion 712 has a number of ribs, and the receiving portion 710 may include a smooth, tubular-shaped inner wall devoid of ribs. In one example, the gripping portion 712 has either between 80 and 85 ribs, or between 20 and 25 ribs. In another example, the gripping portion 712 has 82 ribs in order to allow it to properly engage and mesh with the closure 210. The apparatuses 602, 702 of FIGS. 16 and 17 are therefore configured to open closures with smooth walls (e.g., IMM closures of certain energy drinks).

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A wrench apparatus, comprising:

a handle portion having a first end and a second end disposed opposite the first end; and a body portion extending from the first end, the body portion comprising a first gripping portion and a second gripping portion disposed concentric with respect to the first gripping portion, wherein the first and second gripping portions are each configured to engage a first closure and a second closure, respectively, of a first container and a second container, respectively, in a press fit manner and remove the first and second closures, respectively, therefrom responsive to the handle portion being rotated with respect to the first and second containers, respectively, wherein the first closure has a plurality of ribs having a first length and the second closure has a plurality of ribs wherein the first and second gripping portions are each annular-shaped and have an inner diameter, the inner diameter of the second gripping portion being greater than the inner diameter of the first gripping portion, wherein the first gripping portion has a first number of ribs configured to engage the first closure, wherein the second gripping portion has a second number of ribs configured to engage the second closure, wherein the second gripping portion has a first end having a first diameter and a second end having a second diameter greater than the first diameter, wherein the second number of ribs are partially conical-shaped and longitudinally tapered from the first end of the second gripping portion to the second end of the second gripping portion, thereby allowing the second number of ribs to assist with installation of the wrench apparatus onto the second closure, wherein each of the first number of ribs has a width and a length, wherein each of the second number of ribs has a width and a length, wherein the width of the first number of ribs is greater than the width of the second number of ribs, wherein the length of the second number of ribs is greater than the length of the first number of ribs, wherein the plurality of ribs of the first closure comprises between 27 and 50 ribs, and wherein the first number of ribs is between 20 and 25 ribs in order that the first number of ribs is less than the plurality of ribs of the first closure, thereby allowing the first gripping portion to engage with the first closure via an interference fit, wherein the body portion has a tab member and a grooved region, wherein the tab member extends outwardly from the first gripping portion away from the handle portion, wherein the tab member has a top surface, wherein the handle portion has a top surface disposed coplanar with the top surface of the tab member, wherein the grooved region extends inwardly from the top surface of the tab member, and wherein the handle portion has an elongated cavity on a bottom side disposed opposite the top surface of the handle portion.

2. The wrench apparatus according to claim 1, wherein the second number of ribs is greater than the first number of ribs.

3. The wrench apparatus according to claim 2, wherein each of the second number of ribs has a first from a base to a peak thereof, wherein the body portion further comprises a surface extending from the second gripping portion radially inwardly to the first gripping portion, and wherein the surface extends radially inwardly a second length greater than the first length.

4. The wrench apparatus according to claim 3, wherein the second number of ribs is between 80 and 85 ribs in order to allow the second gripping portion to properly mesh with the corresponding number of ribs of the second closure.

5. The wrench apparatus according to claim 3, wherein the second number of ribs is 82 ribs in order to allow the second gripping portion to properly mesh with the corresponding number of ribs of the second closure.

6. The wrench apparatus according to claim 3, wherein the wrench apparatus is a molded component made from a monomeric material, a polymeric material, or a material that is a mixture of a monomeric and polymeric material.

7. The wrench apparatus according to claim 3, wherein the second end of the handle portion has a thru hole for receiving a keyring therethrough.

8. The wrench apparatus according to claim 3, wherein the surface is frustoconical-shaped.

9. The wrench apparatus according to claim 3, wherein the surface extending from the second gripping portion radially inwardly to the first gripping portion is frustoconical-shaped.

10. The wrench apparatus according to claim 9, wherein the length of the second number of ribs is about twice as long as the length of the first number of ribs.

11. The wrench apparatus according to claim 1, wherein the tab member has a distal end and an extension portion, wherein the extension portion extends from the first gripping portion and is disposed between the distal end and the first gripping portion, wherein each of the distal end and the extension portion have a thickness, and wherein the thickness of the extension portion is greater than the thickness of the distal end in order to provide strength to the tab member while allowing the tab member to open a pop top can.

12. The wrench apparatus according to claim 1, wherein the wrench apparatus has a length from the second end of the handle portion to a distal end of the tab member, and wherein the length is less than two inches.

13. The wrench apparatus according to claim 1, wherein the first number of ribs and the second number of ribs are at an angle with respect to a horizontal plane of the body portion that is less than 90 degrees in order to assist with installation of the wrench apparatus onto the corresponding first closure and the second closure.

14. The wrench apparatus according to claim 1, wherein the length of the second number of ribs is about twice the length of the first number of ribs.

* * * * *